US009206088B2

(12) United States Patent
Harman

(10) Patent No.: US 9,206,088 B2
(45) Date of Patent: Dec. 8, 2015

(54) PLANT PROPAGATION MEDIUM AND METHODS OF MAKING AND USING IT

(75) Inventor: Gary E. Harman, Geneva, NY (US)

(73) Assignee: Cornell University, Ithaca, NY (US)

(*) Notice: Subject to any disclaimer, the term of this patent is extended or adjusted under 35 U.S.C. 154(b) by 152 days.

(21) Appl. No.: 13/637,403

(22) PCT Filed: Mar. 28, 2011

(86) PCT No.: PCT/US2011/030173
§ 371 (c)(1),
(2), (4) Date: Nov. 13, 2012

(87) PCT Pub. No.: WO2011/120035
PCT Pub. Date: Sep. 29, 2011

(65) Prior Publication Data
US 2013/0055635 A1 Mar. 7, 2013

Related U.S. Application Data

(60) Provisional application No. 61/318,073, filed on Mar. 26, 2010.

(51) Int. Cl.
*C05D 9/00* (2006.01)
*A01G 31/00* (2006.01)
*C05F 3/00* (2006.01)

(52) U.S. Cl.
CPC ............... *C05D 9/00* (2013.01); *A01G 31/001* (2013.01); *C05F 3/00* (2013.01)

(58) Field of Classification Search
CPC ............... C05F 3/00; C05F 11/08; C05F 9/04
USPC ............................. 71/1, 13, 15, 20, 21, 23, 24
See application file for complete search history.

(56) References Cited

U.S. PATENT DOCUMENTS

| 6,475,772 B1 | 11/2002 | Kalra et al. |
| 2007/0175825 A1 | 8/2007 | Denney |
| 2007/0256463 A1 | 11/2007 | Davis |
| 2008/0102502 A1 | 5/2008 | Foody et al. |
| 2009/0200241 A1 | 8/2009 | Harman et al. |

FOREIGN PATENT DOCUMENTS

| WO | 98/56232 A1 | 12/1998 |
| WO | 2008/084210 A2 | 7/2008 |

OTHER PUBLICATIONS

Atiyeh et al. "Pig manure vermicompost as a component of a horticultural bedding plant medium: effects on physiochemical properties and plant growth," Bioresource Technology 78 (2001) 11-20.*
Li, Q. et al. "Cowpeat as a Substitute for Peat in Container Substrates for Foliage Plant Propagation," HortTechnology Apr.-Jun. 2009, 19(2) pp. 340-345.*

(Continued)

*Primary Examiner* — Susan McCormick Ewoldt
(74) *Attorney, Agent, or Firm* — LeclairRyan, a Professional Corporation

(57) ABSTRACT

The present invention provides a plant propagation medium, the improvement comprising a manure having a moisture content of 10 to 35 wt % with a salt level sufficient to achieve a conductivity of less than 0.35 dS/m. Also disclosed is a method of manufacturing a manure product and the manure product itself.

17 Claims, 3 Drawing Sheets

Cornell Mix versus Potting Soil-T versus Potting Soil+T

(56) References Cited

OTHER PUBLICATIONS

Oregon State Extension Service, Penhallegon, R., "Nitrogen-Phosphorus-Potassium values of Organic Fertilizers," Publication #FLC437, May 2003 (4 pages total).*

The Ohio State University Extension Fact Sheet, Watson, M., "Testing Compost," Publication #ANR-15-03, Apr. 2003 (4 pages total).*
Carlile, W.R. et al., "Microbial Activity in Growing Media—A Brief Review," Acta Horticulturae 294, 1991 pp. 197-206.*
International Search Report and Written Opinion for corresponding PCT application PCT/US11/30173 (mailed Jun. 17, 2011).

* cited by examiner

**Cornell Mix versus Potting Soil-T
versus Potting Soil+T**

Water Deficit Versus Salt

Water deficit　　　　　　　Salt

Plant Pad

PLANT PROPAGATION MEDIUM AND METHODS OF MAKING AND USING IT

This application is a national stage application under 35 U.S.C. §371 of PCT Application No. PCT/US2011/030173, filed Mar. 28, 2011, which claims benefit of U.S. Provisional Patent Application Ser. No. 61/318,073, filed on Mar. 26, 2010, which is hereby incorporated by reference in its entirety.

FIELD OF THE INVENTION

The present invention relates generally to a plant propagation medium, and to methods of making and using it.

BACKGROUND OF THE INVENTION

The creation of large farms at the commercial level for raising domestic animals in large numbers such as cows, chickens, pigs and swine, has created an increased environmental concern over the animals' waste products produced by such a large domestic production of animals. The primary benefit of housing and feeding larger numbers of agricultural animals at a single site is that the consolidated operations give an economy of scale that lowers per unit product operating costs and improves profitability. However, as the number and size of concentrated, confined animal feeding operations has grown over the years, the development of technology to treat the waste material from these facilities has seriously lagged. One method of utilizing manure is to use it as a fertilizer media. However, there are environmental concerns about direct application of raw manure to the ground, including rainwater runoff of pollutants into surface and ground waters, emissions of greenhouse gases to the atmosphere, and soil contamination, particularly for agricultural purposes, resulting from the large volume of waste. Therefore, utilization of animal manure has become a tremendous environmental problem throughout the world. One method to solve this problem is to use animal manure in a medium, as a method to promote plant propagation.

Although manure may be used to increase soil fertility, if it is used without any processing or aging, it has high levels of salts that may "burn" plants, smell unpleasant, have high levels of pathogenic microorganisms, and decompose rapidly. Composts containing manure are effective uses of manure but are heavy and expensive due to extensive processing. One reason for this heaviness is the high moisture content, as even screw pressed manure has moisture content of 70% or greater.

To effectively improve plant growth, media used for growing plants must have a number of important features. First, media should improve cellular structure, water-holding capacity, and aeration. To do so, the media must be porous and well-drained, yet able to retain moisture to meet water needs of plants between irrigations. Spagnum peat moss is considered to be among the very best planting medium components, because it contains large numbers of water-holding cells. Media for growing plants should also reduce salt content and improve ion exchange. Growing media must have a low salt content but a high ion exchange capacity to supply nutrients necessary for plant growth.

Plant media should have a distinct advantage of being renewable. Media such as peat moss is at best semi-renewable and has a large carbon foot print because of the harvesting, drying, and shipping it requires. In some years, peat moss has been in short supply because of vagaries of weather during the harvest season. Manure is, of course, available nearly everywhere.

Planting media should ideally be low in weight when dry. Generally, products for the retail market state that a bag contains dried manure or composts. However, these commercially available bags typically weigh 40 lb per cubic foot and contain a great deal of water which is undesirable.

Commercially available manure products are generally not dust, weed, odor, and pathogen free. Almost all commercially available composts, dried manures and the like are not "clean hands" products, making them difficult to spread and use. Furthermore, commercially available mixes are generally heavy and are largely impermeable to gas exchange. The impermeability to gas exchange makes these mixes poorly suited to quality plant production.

In the prior art, a variety of treated manures are known. However, they are all only effective in accomplishing one or two of the aforesaid purposes, and no treated manure that can comprehensively answer all of the aforesaid purposes is known as yet.

The present invention is directed to overcoming these deficiencies in the art.

SUMMARY OF THE INVENTION

One aspect of the present invention is directed to a plant propagation medium, the improvement comprising a manure having a moisture content of 10 to 35 wt % with a salt level sufficient to achieve a conductivity of less than 0.35 dS/m.

Another aspect of the present invention relates to a method of manufacturing a manure product. The method comprises providing a slurry of manure and separating solids from the slurry of manure. The separated solids are then dried at a temperature sufficient to kill pathogens and produce a manure product having a moisture content of 10 to 35 wt % with a salt level sufficient to achieve a conductivity of less than 0.35 dS/m (i.e. deciSiemens per meter).

A further aspect of the present invention relates to a manure having a moisture content of 10 to 35 wt % with a salt level sufficient to achieve a conductivity of less than 0.35 dS/m.

The present invention can utilize a screw pressed, non-composted manure which is dried with heat through a fluidized bed system to about 10-35% moisture content and does not contain high salt levels or soluble nutrients. As a result, the potential for plant toxicity or burning is eliminated. It is also free of pathogenic microbes, light weight, and can be a slow-release fertilizer. The manure of the present invention may be obtained from a variety of sources and, therefore, can be produced nearly anywhere, reducing shipping costs.

The present invention is directed towards use of manures as a total or partial replacement of peat moss in horticultural potting mixes with dairy manures and other agricultural wastes. The manure of the present invention has exceptional abilities to provide nutrition and other advantages, such as drought and salt resistance, to plants grown in the mixes. The processes and source materials used in the present invention overcome many of the deficiencies normally associated with the use of manures in horticultural mixes. The present invention also discloses efficient and novel pads and related manufactured articles containing manures and other agricultural wastes for plant growth including uses such as living roofs, living walls, or instant sod. The products manufactured by the present invention are made in large part or entirely with organic dried manure which has a near optimal moisture content for long shelf life.

Since it is non-composted, the dried manure of the present invention has not been broken down by microorganisms and it retains a more porous, water retaining capability than composted manure, with a consistency somewhat similar to peat moss. This dried manure would be more renewable than peat moss and easier to use than current manure based products. In addition, the manure of the present invention may be used as is, incorporated into mixes, formed into pad/mats, and/or be supplemented with beneficial organisms, nutrients, and minerals.

The dry manure product of the present invention has a significant advantage over composted products. Composted products are digested by microorganisms, and the cellular structure of these materials is largely collapsed. Alternatively, the dried manure produced by the present invention is from screw pressed manure, and the salts are largely removed, so the conductivity, which is inversely proportional to salt content, is low. The lignin that remains after bovine digestion in the present invention has such as high ion exchange capacity that it is being used to remove heavy metals from polluted water (Harman et al., "Removal of Heavy Metals From Polluted Waters Using Lignocellulosic Agricultural Waste Products," *Indust. Biotechnol.* 3:260-68 (2007), which is hereby incorporated by reference in its entirety). Depending on the pH, heavy metals such as lead can be absorbed to a level of 2-7%.

The manure component in the present invention is very light weight since it has low water content. A cubic foot of it weighs approximately eight pounds when fully dry. Therefore, the present invention contains less water than other commercially available composts. When manure is obtained for the drying operation of the present invention, even after extensive screw pressing, the moisture content is about 70%, because manure holds a great deal of water. This has some advantages as noted above but is a big disadvantage when homeowners try to take this material home.

The dried manure product produced by the present invention is dust-weed, odor- and pathogen-free. Furthermore, when a bag of manure product is opened, the material will not stick to clothing or hands. This is a distinct advantage over pre-existing composts, dried manures, and the like which are not "clean hands" products, and are more difficult to spread and use than products of the present invention.

The manure of the present invention contains large numbers of water-holding cells (Harman et al., "Removal of Heavy Metals From Polluted Waters Using Lignocellulosic Agricultural Waste Products," *Indust. Biotechnol.* 3:260-268 (2007), which is hereby incorporated by reference in its entirety), and holds four to five times its weight in water. This cellular structure of the manure of the present invention also provides a highly porous medium that is necessary for gas exchange in roots; heavy mixes that are largely impermeable to gas exchange are poorly suited to quality plant production. In addition, the manure used in the present invention has a nutrient status of about 1:1:1 Nitrogen:Phosphorous:Potassium ("NPK"). The nitrogen is not immediately available, which prevents plants from being burned by excessive salts and/or nutrients.

The treated manure of the present invention contains six essential properties. First, it retains cellular structure, which is advantageous for reduction in weight and to assist in soil or potting mix aeration to permit good root growth. Second, it is a fibrous material of a size so that nearly all of the material is retained by a 35 mesh screen, but still passes through a 4 mesh screen. These sizes are underestimates of the actual particle sizes since, as fibers, their length is considerably greater than their diameter. The sufficient size distribution allows the fibrous material to act as a media component for uses analogous to peat moss. Third, it is light weight and easy to handle, and fourth, it is free from pathogens that frequently occur in manures. It is also free from weed seeds and is a "clean hands" product that will not soil clothes or hands. No such product exists in the commercial marketplace that includes all of these features.

DETAILED DESCRIPTION OF THE INVENTION

Figure 1:
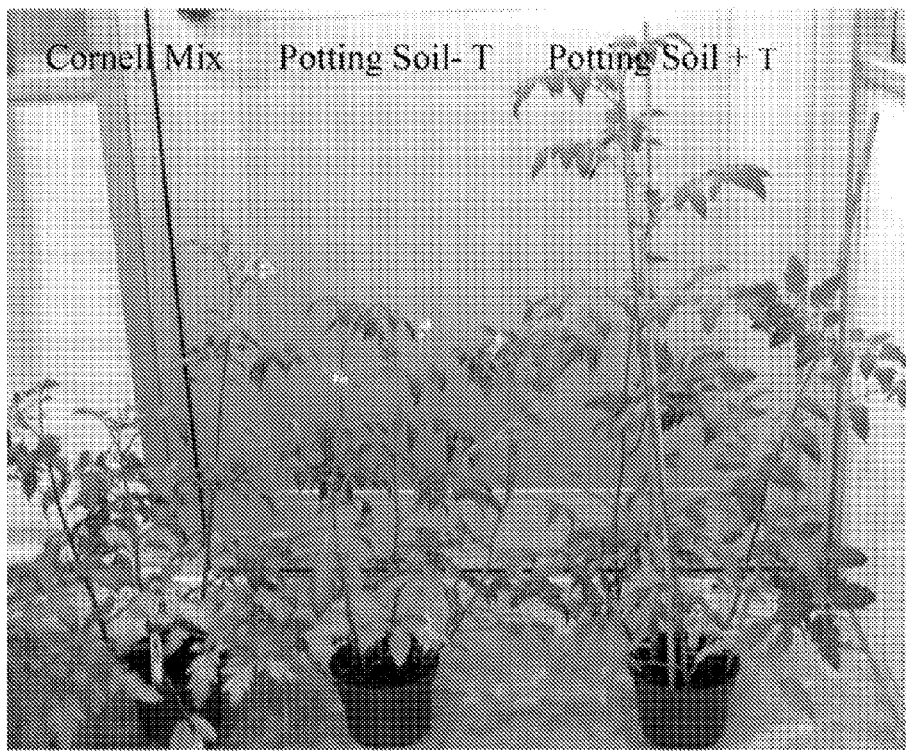
FIG. 1 illustrates the results of an experiment comparing plants grown in a Cornell mix versus plants grown a potting soil containing a manure in accordance with the present invention and *Trichoderma* strains versus plants grown in potting soil containing a manure in accordance with the present invention without *Trichoderma* strains present. Plants grown in the Cornell mix (left plants) were yellow and soon died from lack of nitrogen fertilizer. The plants in the center were in the potting soil without *Trichoderma* strains, and the plants on the right were grown in potting soil plus *Trichoderma*. The plants in the center were much healthier than those in the Cornell mix, but were substantially smaller than the ones with *Trichoderma*.

One aspect of the present invention is directed to a plant propagation medium, the improvement comprising a manure having a moisture content of 10 to 35 wt % with a salt level sufficient to achieve a conductivity of less than 0.35 dS/m.

The present invention can be used to treat a wide variety of plants or their seeds. Suitable plants include dicots and monocots. More particularly, useful crop plants can include: alfalfa, rice, wheat, barley, rye, cotton, sunflower, peanut, corn, sweet potato, bean, pea, chicory, lettuce, endive, cabbage, brussel sprout, beet, parsnip, cauliflower, broccoli, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, sorghum, grape, canola, crambe, safflower, squash, pumpkin, and sugarcane. Examples of suitable ornamental plants are: *Arabidopsis thaliana, Saintpaulia*, petunia, pelargonium, poinsettia, chrysanthemum, carnation, zinnia, and turfgrasses.

The medium contains manure with a moisture content of 20 to 35 wt %, as compared to natural cow manure which contains a moisture content of between 70 to 90%. Examples of moisture content that may be present in the plant propagation medium of the present invention may be 10, 15, 20, 25, and 30 wt %. In one embodiment of the present invention, the manure of the plant propagation medium comprises 30-35 wt % of the plant propagation medium.

As noted herein, the salt level of the present plant propagation medium is sufficient to achieve a conductivity of less than 0.35 dS/m. Examples of salt levels that may be found in the present plant propagation medium include 0.30 dS/m, 0.25 dS/m, 0.20 dS/m, 0.15 dS/m, and the like.

In one embodiment of the present plant propagation medium, the manure contains a nutrient content by wt % of 0.3 to 0.8, 0.4 to 1.2, and 0.4 to 1.2 of N, $P_2O_5$, and $K_2O$, respectively, and soluble nitrogen levels of less than 15 ppm. However, the nutrient content for nitrogen, $P_2O_5$, and $K_2O$, may, temporarily or permanently, drop lower in certain embodiments. Conversely, in other instances, nutrient content may rise higher than the typical given range, temporarily or permanently. The levels of each nitrogen source, respectively, may be adjusted for optimal growing conditions for any number of individual plants or species of plants.

In another embodiment, the medium may contain a non-dusting, pathogen free and odor free manure. In this embodiment, the medium is a "clean hands" product and, therefore, will not leave product remnants on hands or surfaces that contact the medium. The medium is free of human pathogens such as E. coli.

The plant propagation medium of the present invention is capable of being certified as organic. Some useful ingredients in this regard include peat moss, so long as no lime or chemical surfactants are mixed with this medium. Peat moss is naturally acidic and so lime is frequently added. It also, when dry, is water repellent, so surfactants are frequently added to aid wettability. In many cases, addition of either will prevent organic certification. Even though it is at best semi-renewable, it is still allowed for use in organic production.

In this specification, "composting" refers to a process wherein organic materials (particularly organic waste) are processed to compost through the action of microorganisms. For example, the composting can be carried out by leaving organic materials (particularly organic waste) to an aerobic fermentation, while preferably subjecting them to appropriate ventilating and stirring conditions for a certain period. Here, "organic materials" mean organic compounds which are liable to chemical processing through the action of microorganisms, and preferably biodegradable organic materials, i.e. organic compounds without non-biodegradable materials such as plastics.

The composting of animal waste to create a suitable organic substrate in which to cultivate plant growth has long been the accepted practice. The process, on which there are several variations, is generally one of aerobic biodegradation (i.e., fermentation), and comprises the use of horse manure and poultry manure; straw or other carbohydrate-rich substances essentially containing cellulose, hemicellulose, and lignin; nitrogen-rich nutrients, e.g., cotton seed, sunflower seed, seed meals, brewer's grains, and urea; and inorganic conditioners, e.g., lime and gypsum. Broadly speaking, composting involves the fermentation of straw and animal manure over a period of approximately one month, with periodic turning and wetting to assure proper biological activity.

This solid phase fermentation process involves microorganism growth in a solid phase acting as substrate or support in the absence of water flow. Composting produces a significant release of heat and the temperature evolution follows three phases: a mesophilic phase (30-40° C.), a thermophilic phase with temperatures that may reach 70° C., and a cooling and maturation phase where the compost temperature decreases to surrounding temperature. Temperatures of 60-65° C. are desirably maintained to achieve hygienization (i.e. microorganism destruction along with an active humidification without compost cooking) Compost may produce an odorless humus having a good fertilizing value ratio of nitrogen, $K_2O$, and $P_2O_5$.

Manures of various sorts are useful ingredients for the present invention so long as the manure is not adulterated with pesticides or other chemical additives. Various composts may also be used, so long as they do not contain inorganic additives. Chilean nitrate, or mined sodium nitrate, can be used in organic products so long as the total nitrogen added in this way does not exceed 20% of the total nitrogen level. A variety of other agricultural waste materials, including chaff or hulls from seeds, such as those from rice or coffee, are useful for the plant propagation medium of the present invention.

These and other materials can be added to, or included in, various manufactured media for use as living walls, living roofs, instant turf applications, erosion control, and in commercial vegetable production.

Any of a number of organisms can be added to the plant propagation media of the present invention. These include those strains described in WO 2010/091337 to Harman; Harman, "Multifunctional Fungal Plant Symbionts: New Tools to Enhance Plant Growth and Productivity," *New Phytol.* 189: 647-49 (2011); Lorito et al., "Translational Research on *Trichoderma*: From 'Omics to the Field," *Annu. Rev. Phytopathol.* 48:395-417 (2010); Shoresh et al., "Induced Systemic Resistance and Plant Responses to Fungal Biocontrol Agents," *Annu. Rev. Phytopathol.* 48:21-43 (2010), which are hereby incorporated by reference in their entireties. Other beneficial organisms include mycorrhizal fungi, plant growth promoting rhizobacteria, azospirillum, and nitrogen fixing rhizobia. These organisms have very many useful attributes. The fungi change gene expression and cause plants to exhibit increased resistance to disease-causing pathogens ("resistance to biotic stresses"), exhibit increased resistance to environmental stresses such as resistance to drought, salt or temperature ("resistance to abiotic stresses"), and increase the efficiency of uptake of nitrogen ("improved nitrogen use efficiency ['NUE']"). Beneficial microbes may be formulated or mixed to prepare granules or liquid suspensions. These can be mixed directly into soils or potting mixes. The term "soil" in this specification is used to include any medium capable of supporting the growth of plants and, therefore, includes common soil, humus, manure, compose, sand, and the like, and also artificially created plant growth media. The preparations are then mixed into the soil or planting mix volume for greenhouse applications or into the upper volume of field soil (Harman, G. E., "The Dogmas and Myths of Biocontrol. Changes in Perceptions Based on Research with *Trichoderma harzianum* T-22," *Plant Dis.* 84:377-393 (2000), which is hereby incorporated by reference in its entirety). Equipment and procedures for such applications are well known and used in various agricultural industries. In one embodiment of the present invention, the plant propagation medium comprises a microbe beneficial to plant growth.

Granules can be broadcast onto soil surfaces that contain growing plants, to soil at time of planting, or onto soils into which seeds or plants will be planted. Typical rates of application range from 1 to 500 kg of product containing $10^7$ to $10^9$ cfu/g depending on the plants to be treated and the goals of the treatment. Alternatively, spray solutions can be prepared and applied to give similar rates (Harman, G. E., "The Dogmas and Myths of Biocontrol. Changes in Perceptions Based on Research with *Trichoderma harzianum* T-22," *Plant Dis.* 80:736-741 (1996); Lo et al., "Improved Biocontrol Efficacy of *Trichoderma harzianum* 1295-22 for Foliar Phases of Turf Diseases by Use of Spray Applications," *Plant Dis.* 81:1132-1138 (1997), which are hereby incorporated by reference in their entireties).

Liquid suspensions of the beneficial microorganisms can be prepared by mixing dry power formulations into water or other aqueous carrier, including fertilizer solutions, or by diluting a liquid formulation containing the microbe in water or other aqueous solutions, including those containing fertilizers. Such solutions can then be used to water planting mixes either prior to planting or else when plants are actively growing.

*Trichoderma* proliferates and colonizes the root system of the plant, producing deeper root growth and enhanced development. These benefits are the result of both displacement and control of deletrious root microflora and by direct effects on plants by as yet unidentified biochemicals. Exemplary organisms suitable for this aspect of the present invention are fungi in the genus *Trichoderma* (U.S. Pat. No. 5,260,213 to Harman et al., which is hereby incorporated by reference in its entirety), including *Trichoderma harzianum*; the protoplast fusion progeny of *Trichoderma harzianum* 1295-22, known as "T-22", (ATCC 20847) and T-22™ (BioWorks, Inc. Geneva, N.Y.); and *T. virens*, formerly classified as *Gliocladium virens* (U.S. Pat. No. 5,165,928 to Smith et al., which is hereby incorporated by reference in its entirety). Even better results are likely if the *Trichoderma* strains used include one or more of the strains described in PCT International Patent Publication No. WO 2010/091337 to Harman, which is hereby incorporated by reference in its entirety. In one embodiment of the present invention, the microbe in the plant propagation medium is a *Trichoderma* strain.

In another embodiment, the plant propagation medium of the present invention has a pH of between 6.0 and 7.5 or, alternatively, an even lower pH of between 4.0 and 6.0. Levels of pH must be adjusted before use of the plant propagation medium.

Manure is likely, when present at high percentages of compositions, to release excessive amounts of soluble phosphates when they first are wetted for planting. These levels may reach 450 ppm in fields with banded fertilizers, which could be toxic to seedlings (Pan et al., "Phosphorous Fertilizer. Phosphorous Banding and Starter," *Washington State University Extension Publication* EB 1637, which is hereby incorporated by reference in its entirety), although a slightly higher toxic level likely occurs in potting soils where the nutrient is unlikely to be concentrated in bands. In addition, as watering occurs, the phosphate is flushed out of the growing medium, and media then are likely to have too little phosphate to support proper plant growth (1-5 ppm or less). This difficulty may be overcome by adding components of the present invention to the medium that will absorb excess phosphate and release it over time. The additional components provide a much more even level of this essential plant nutrient, with concomitant improvements in product performance. Materials that absorb phosphates include clays. Different clays absorb more or less efficiently and can include chlorite, illinite, kaolinite, and montmorillionite.

In an additional embodiment, the plant propagation medium comprises a slow release fertilizer or soil conditioner, a mixture of rapid-, medium- and slow-release nitrogen sources, plant-based natural nutrient substances or high nitrogen wastes, a plant-based natural nutrient substance in the form of cakes or residues from oil seed recovery operations, peat moss, leaf compost, vermiculite, perlite, Chilean nitrate, rice hull, coffee chaff, buckwheat hull, chicken manure, various tree barks with or without composting, mushroom compost, or a compost of other organic material.

The slow release fertilizer of the present invention provides nitrogen to the plant at a reduced rate than in naturally occurring soil. The slow release fertilizer, combined with a soil conditioner, loosens the soil and provides for increased nitrogen efficiency.

Mushroom compost is the medium that remains after mushroom production. A variety of different materials can be used to make the mushroom compost. The compost may be prepared by mixing straw materials with protein meal, cottonseed hulls, gypsum, and water and allowing the mixture to ferment by action of the microflora, molds, and bacteria therein. This fermented mixture is treated to convert free ammonia and other nitrogenous compounds into microbial protein. This mushroom compost medium is high in nutrients and may be prepared for use similarly to the dairy manure preparation of the present invention.

The process of oil seed recovery operations begins with oil seed having a significant fat content, such as canola oil seed, soybean, traditional rapeseed, traditional flax, linola, sunflower and mustard oil seed meals. The steps involved in this process include solubilizing material from oil seed meal, which solubilizes fat in the meal, then removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted and allowed to settle to form an aggregated, dense cake or residue, which is separated from the residual aqueous phase and dried.

In another embodiment, the plant propagation medium comprises a pad made of natural or synthetic fibers. The pad desirably comprises synthetic fibers, natural fibers, or combinations thereof.

The natural fibers can be made from any of the following materials: kenaf, wood, pulp, hemp, cotton, cellulose, jute, abaca, kapok, canton, pacol, ramie, maguey, sisal, pina, buntal, cabo negro, coir, or combinations thereof. Rayon or some other cellulose derivative is a preferred material due to its biodegradability.

The synthetic fibers can be made from any of the following materials: polypropylene, PET, polyester, acrylic, rayon, acetate, liquid crystal polymers, aramids, polyphenylene sulfide, fiberglass, polybenzimidazole, melamine, polyvinyl chloride, ceramics, polyethylene, polyvinyl alcohol, or combinations thereof.

The pad is desirably made with a nonwoven material.

In yet another embodiment, the pad comprises the plant propagation medium and the fibers, which are integrated into a single mass.

The pad may be enhanced by seeding it with a sticky substance, such as butyl adhesives and organic gums, including gum arabic, carheegan, or similar materials, to maintain the pad's structural integrity. Other exemplary substances include dextran and cellulose derivatives.

In a further embodiment, the pad comprises the plant propagation medium present in the pad as a layer between layers of the fibers. The pad is prepared by applying the substance to a previously formed pad. Such applying is carried out by spraying, coating, or dusting the substance on the previously formed pad.

In yet another embodiment, the pad further comprises a super-absorbing polymer capable of holding 20 or more times its weight in water. Examples of super absorbing polymers include treated cellulose fibers, acrylamide powders, and starch derivatives.

The super absorbing polymer of the pad has a high rate of liquid-absorption due to the particulate polymers disposed on the pad. The polymer may be disposed on the top or bottom of any layer or fiber of the pad. Further, it can prevent the liquid once absorbed in the absorbent core from flowing backward to the surface of the pad, due to the particulate super absorbing polymers disposed on the layer or layers.

In another embodiment, the pad further comprises plant seeds and a germination enhancing medium. As used herein, the term "germination enhancing medium" causes rapid emergence of the plant from the seed, and thereby allowing better weed control around the plant. Exemplary forms of germination enhancing medium include mulch that is composed of particulate cellulose, straw, or some similar matrix. The germination enhancing medium serves to promote growth of a plant or plant seed while planted in the plant propagation medium pad.

In an additional embodiment, the pad comprises the plant propagation medium with dried concentrated mushroom compost and natural or synthetic fibers. This embodiment of the present invention is carried out in accordance with the embodiments of the previous pad comprising a plant propagation medium and natural or synthetic fibers.

In another embodiment, the plant propagation medium is used as part of a method of growing plants comprising providing the plant propagation medium; planting plants or plant seeds in the plant propagation medium; and growing the planted plants or plants from the planted plant seeds in the plant propagation medium.

Another aspect of the present invention relates to a method of manufacturing a manure product. The method comprises providing a slurry of manure and separating solids from the slurry of manure. The separated solids are then dried at a temperature sufficient to kill pathogens and produce a manure product having a moisture content of 10 to 35 wt % with a salt level sufficient to achieve a conductivity of less than 0.35 dS/m.

In the first step of the slurry operation, raw liquid manure, such as cow manure, is collected at a common location for treatment. In the present environment in many states of the United States, the manure may be collected into a sludge lake much like a holding pond or tank that provides some evaporation. In any event, the materials can be collected in a single place or transported to an area where the slurry operation will be performed. First, the raw manure is added to a mixing vessel containing a digester liquid which has largely been depleted of digestible organic materials but contains a similar mineral content as the raw manure, and the raw manure and digester liquid are agitated to produce a pumpable slurry. The pumpable slurry is withdrawn from the mixing vessel and filtered to remove the majority of water insoluble solids present in the pumpable slurry, thereby leaving a resultant liquid containing ammonia and reactive organic materials. The purpose of the first step is to remove as much water and liquid from the manure materials so that the liquid is completely removed, leaving a solid cake-like material. Using a rotary press for sludge, concentrations in the 30 wt percent solids can be obtained, while the remainder is water. Thus, the liquid-laden manure is fed into the rotary press on a continuous basis, allowing for continuous operation of the removal of the wastewater and separation of wastewater from the original sludge materials.

The rotary pressing of the sludge is desired because the process is continuous and, unlike batch processing, does not have to wait for sedimentation or decantation to occur. Typically, a rotary press needs a small physical space and can be either a mobile unit or a fixed unit, depending on the environment it is to be used in.

This aspect of the present invention is carried out in accordance with the various embodiments of the previous aspect.

A further aspect of the present invention relates to a manure having a moisture content of 10 to 35 wt % with a salt level sufficient to achieve a conductivity of less than 0.35 dS/m.

The manure of the present invention may, in certain embodiments, contain no plant seeds, especially no weed seeds. This aspect of the present invention is carried out in accordance with the various embodiments discussed above.

While the process of the present invention has been described in detail herein for the conversion of manure generally, it is to be understood that such processes are readily adaptable to various types of manure as well as other waste products, including beef cattle manure, ovine manure, and concentrated swine waste. In addition, the process of the present invention includes all types of poultry manure, including broiler manure and broiler litter. It is within the ability of one of ordinary skill in the art to adapt such processes without undue experimentation. Therefore, the present invention is not limited simply to the process described herein but also includes such adaptable processes which are within the abilities of one of ordinary skill in the art.

Having now generally described the present invention, the same will be more readily understood through reference to the following examples which are provided by way of illustration, and are not intended to be limiting of the present invention, unless specified.

EXAMPLES

Example 1

Preparation of Manure

In viewing products in the greenhouse and garden market, various deficiencies became clear. One of these deficiencies deals with the very commonly used horticultural material, manure. Manures are widely used in agriculture where they provide needed organic matter and nutrients. Most of this occurs on farm fields and is outside the scope of this invention.

Various manure-based products also are sold to homeowners, landscapers and the like. In some cases (rare) users pick up the manure directly from the farm while in other cases, manure is bagged and sold by horticultural retailers. All of the products which are commercially available have serious deficiencies. They invariably have high levels of moisture (even those labeled as "dehydrated" manure), are heavy, muddy, very prone to staining clothing, hands or cars if they are spilled. Moreover, they are likely to have high salt contents that can burn plants. Commercially available manures typically contain bacteria with human health considerations, such as *Escherichia coli* and other bacteria. They also contain weed seeds, which clearly is a drawback. In addition, manures, especially those from ruminant animals retain their cellular structure, which gives them great water retention capabilities and improves soil aeration. It was identified that materials with low cellulose content are needed. Cellulose, present at high levels in plant cell walls degrades rapidly in soil. In so doing, the cellulose-degrading microbial populations tie up necessary plant nutrients and so plants lack this essential nutrient. Moreover, plant growth constituents need to have high ion exchange capacity in order to efficiently retain plant nutrients and then, in equilibrium with plant root uptake, to release these nutrients. Lignin is very capable in this regard, especially for metal ions (Harman et al., "Removal of Heavy Metals From Polluted Waters Using Lignocellulosic Agricultural Waste Products," *Indust. Biotechnol.* 3:260-268 (2007) ("Harman 2007") which is hereby incorporated by reference in its entirety). In the retail and commercial greenhouse arenas, manures and other organic products frequently are composted and composted products are more frequently sold than manure. Composts frequently are quite good for plant growth, but they suffer from the fact that the cells are collapsed and so the products are more dense and lack the advantages of a high level of cellular structure including high levels of uptake of water and other materials (Harman 2007).

The present invention produces a product that is otherwise unavailable in marketplace. The properties desired in the present invention's manure-based product with properties as follows. First, retention of the cellular structure was desired, which is advantageous for reduction in weight and to assist in soil or potting mix aeration to permit good root growth. Second, the material needed to be a fibrous material where nearly all the material was retained by a 35 mesh screen but passed through a 4 mesh screen. These sizes are underestimates of the actual particle sizes since, as fibers, their length is considerably greater than their diameter. This size distribution allowed the material to act as a media component for uses analogous to peat moss. Third, the product needed to be light weight and easy to handle. Fourth, the product needed to be free from pathogens that frequently occur in manures. Fifth, the product needed to be free from weed seeds. Sixth, a high lignin to cellulose ratio was desired. Seventh, the product needed to be a "clean hands" product that would not soil clothes or hands. This is of paramount importance for use by homeowners. No one wants a bagged product that, if handled, will soil hands and, if spilled, will stain clothing, car interiors and the like. Eighth, a low salt content as measured by conductivity of the solutions was desired. And, ninth, a water activity level that was sufficiently low (less than equilibrium below a relative humidity of 90% (defined as Aw=0.9) was desired, to prevent bacterial and fungal growth.

The development of such materials has been successful and is illustrated by the present invention. In order to obtain a material with a high ratio of lignin to cellulose, bovine manure was used. Cattle, along with sheep, contain in their rumens bacteria that digest cellulose and thus create a product with a high lignin:cellulose ratio (Harman 2007). Secondly, manure solids were obtained from dairies that have liquid slurry operations and that separate the solids from liquids using a screw press. It is the applicant's belief that products that stop at this step are sold as "dehydrated cow manure." This process removes many of the soluble salts that may injure plants growing in high levels of manure. Finally, solids from the screw press were dried in a fluidized bed dryer with an air temperature of over 200° C. This resulted in a free-flowing fibrous mixture that has the properties designated above as necessary. A table of properties comparing the products of the present invention relative to other products follows.

TABLE 1

Comparison of Present Invention versus Other Manures

| Manure Property | Manure Type | | | |
|---|---|---|---|---|
| | Natural Cow Manure | Dehydrated Cow Manure | Cow Manure Composts | Present Invention Manure |
| Moisture Content | 70-90% | >40% | Variable | 10-35% |
| Weight per Cubic Foot | Approximately 60 lb | 25-30 lb | Variable | 9-15 lb |

TABLE 1-continued

Comparison of Present Invention versus Other Manures

| Manure Property | Manure Type | | | |
|---|---|---|---|---|
| | Natural Cow Manure | Dehydrated Cow Manure | Cow Manure Composts | Present Invention Manure |
| Salinity Level (measured by conductivity) | High | Variable | Unknown | Low |
| Handling Ability | Wet, muddy, sticks to any material it contacts | Wet, muddy, sticks to any material it contacts | Variable | Dry, clean, easy to handle |
| Odor | Strong manure smell | Strong manure smell | Variable | Hay-like, relatively faint odor |
| Weed Seed Presence | Present | Present | Variable | None |
| Human Pathogen Presence (i.e. E. coli) | Present | Unknown | Unknown | None |
| Ability to Retain Plant Cellular Structure | Yes | Yes | No | Yes |
| Bacterial and Fungal Growth Supported | Yes | Yes | Yes, but may be desirable to increase beneficial microbes | No |

As illustrated by Table 1, the dry manure of the present invention meets all necessary standards described herein, making it unique. It provides, in addition to the characteristics noted above, a slow release nutrient source for nitrogen especially that becomes available to plants beginning at about 4 weeks after planting and continuing for more than 100 days. It also adds valuable organic material to the soil. It has a nutrient analysis (wt %) of 0.8 to 1% N, 0.8 to 1.2% $P_2O_5$, and 0.8 to 1.2% $K_2O_5$ (these units are used since they are standard in the horticultural and fertilizer industries).

The experimental methods used to create the manure composition of the present invention required three primary steps. The first step in the process of digestion of ruminant animal digestive system waste was to remove cellulose. The ability of cows or sheep to digest cellulose assisted in this removal process and left the cellular structure intact. Second, a screw press and liquid slurry process was used from dairy operations to separate solids from liquids. The resulting solid material was similar to what is referred to as "dehydrated cow manure." Third, the solids were passed into a fluidized bed dryer where the manure was subjected to strong air flow and to a temperature of 395° F.

Exposure to such a high temperature of 395° F. killed all weed seeds and removed most odors. The high temperature also resulted in the production of a manure composition that was solid, lightweight, non-soiling, non-staining, and easy to handle by users.

Manure typically has a high salt content that limits its use in horticultural applications. High levels of salts can burn or otherwise damage plants. Media for good plant growth needs to have a conductivity value of less than 0.4 dS/m. The manure used in the process of the present invention is obtained from dairy operations that recover their manure in a liquid slurry operation and that then separate solids from liquids using a screw press. Most of the salts are removed with the liquid portion. The solid material from the press has a moisture content of 70-80 wt % on a wet weight basis even though is appears to be relatively dry. This screw press material is commonly sold as "dehydrated cow manure" in the retail greenhouse industry, even though it is heavy and wet. In the present invention, this screw pressed material is then dried with heat through a fluidized bed system to give a final product of about 30% moisture content. This material has been repeatedly tested, and is free of pathogenic bacteria, weeds, and objectionable odors.

This moisture content is a key component of the present invention. The water activity ("Aw") level is about 0.7 (meaning it is in equilibrium with air at 70% relative humidity) which is an optimal moisture level for optimal shelf life of beneficial microbes. It also is possible to increase the moisture content to an Aw level of about 0.95 by inclusion of peat moss while still avoiding growth of objectionable microbes. Studies of the present invention demonstrate that such mixtures preclude growth of contaminating organisms while still permitting growth and survival of beneficial microbes.

This same moisture content also is optimal for handling. More moisture than 30 wt % increases weight and can support growth of spoilage organisms. Lower moisture levels provide materials that are too dusty for use in greenhouse operations. It also is increasingly expensive to dry as moisture content is further reduced. A similar product is set forth in U.S. Pat. No. 7,883,625 for oil and other spill cleanup. However, the moisture content of the manure in that application is 10%, which is optimal for oil spill cleanup but too low for the present use.

The present invention produced a very highly processed fiber based on bovine manure. The resulting material from the bovine manure had a high level of retained cellular structure, which added good aeration and porosity.

Example 2

Preparation of Mushroom Compost

One other material useful in the present invention is mushroom compost. This is the manure-containing material that remains when mushrooms are produced and that is then composted by several different companies. This material is useful also as a soil conditioner, and has a high nutrient analysis (typically 2.5:0.5:0.5 of $N:P_2O_5:K_2O$). It is available in large quantities and is frequently used in bulk by landscapers to add nutrients and organic materials to soil.

This material was dried as noted above, and again produced a weed free material of high value. At present, there are undried mushroom compost products available, but they are heavy, typically at or about 50 lb per cubic foot, and very messy. Many retail greenhouse operators will not sell the moist product bagged, because the heavy bags are very prone to damage, and if spilled in a car interior, the stain is very difficult to remove.

The dried product of the present invention is lighter, at approximately 25 lb per cubic ft., and it is concentrated relative to the moist material. The product is concentrated since there is about a 30% volume reduction during drying. It is again a "clean hands" material that will not soil clothes, hands, or other surfaces.

Example 3

Preparation of a Useful Potting Soil

While manure is a very useful material, it is not suitable for use as a stand-alone propagation medium. It can be used as a soil amendment, as noted above and potentially as a component for potting media. Some of the difficulties with manure as a sole substrate for plant growth include the following. First, the pH of dairy manure is high, about 7.2 to 7.8. Most plants need a pH of around 6.0 to 6.8 for optimal growth. Further, the soluble P and K contents are relatively high, in most cases and, depending on the exact source of manure, around 500 ppm. This is high for optimal plant growth, and, therefore, without further washing and extraction of the wet manure, which is costly, the medium cannot be used as total replacement for peat moss, or as the primary component of potting medium for plant growth. However, as noted herein, there is a solution to this problem. These limitations do not apply when manure is used as a soil conditioner.

The materials and mixtures were prepared as candidates for growing media. Primary tests were evaluations of growth of tomato seedlings. As a standard, growth in candidate materials was compared with a Cornell mix, which is a standard peat/vermiculite mixture that contains additions of N as nitrate and ammonia, P and K as plant nutrients. Plant growth assays were augmented with tests for nitrate N, ammonia N, soluble P and K using a standard soil test kits (LaMotte). To make the semi-quantitative procedures in the soil test kit more accurate, standard curves with known concentrations of the material being tested and measured optical density using a plate reader were prepared.

These issues with use of manure have largely been overcome by the following. As a first step, the pH had to be adjusted. When the experiments first began, various acidic materials were used, including mineral acids and acidic natural materials such as pine bark, to bring the pH to about 6.5. This adjustment was unsuccessful because as the acidified materials set for a few days, the pH increased again to over 7.0. Apparently, the acid, regardless of source, reacted slowly with buffering components in the manure, and the pH slowly coasted upwards. It was found that acidification to about 5.5 initially resulted in a medium that would maintain stable pH levels of about 6.2-6.5.

The acidified manure with pine bark was then used as an acidified planting medium, again without success. The problem was that the N level, even if originally at reasonable level (ideally about 100 ppm available N as nitrate or ammonia) dropped to low levels of 10 ppm or less, primarily because the nitrogen was tied up with the highly carbonaceous substrate by microbial activity into organic N compounds. The N would be expected to eventually be released, but the mix was still not conducive to plant growth. Another issue was the fact that manure obtained, as noted above, had a higher than desirable available soluble P and K content which impedes plant growth.

Addition of nitrogen to the media in a convenient and affordable form was also an issue. One method for addition that works fairly well was to add a specific amount of dilute (5% of reagent strength) nitric acid to montmorillinite clay specifically sold for use as a soil conditioner. The requisite amount of acid to provide both acidification and a good level of N for media can be added to the montmorillionite clay and used both as a nutrient source and a pH adjustment method.

The composition of the potting soil was the subject of a great deal of development work, as described earlier. The current product is 56% peat moss, 33% manure, 10% acidified montmorillionite, which is a manure-based media that gives good plant growth. The pH of the growing medium maintains at about 6.2 to 6.5 over several weeks of plant growth, and it supplies 75 ppm available N, 250 ppm available P and 300 ppm available K. The total NPK is 2585 ppm N, 452 ppm P, and 463 ppm K, which reflects the slow release nature of the nutrients. It is worth noting, as will be explained further herein, that the mix when freshly prepared had a very high level of nitrate N, phosphate, and potassium (i.e. 1200, 1800 and 2200 ppm, respectively). These levels are quite high and likely to damage plant growth. However, as soon as the mixture was wetted for planting, the levels of these nutrients immediately dropped to 75 ppm available N, 250 ppm available P, and 300 ppm available K. The reasons for this drop are important and will be the subject of the following examples.

Example 4

Uses of Media

As described herein, the dried manure product of the present invention has many necessary properties for use in horticulture. The product is designed to provide specific levels of nutrients. The total nutrients available in the 30% moisture content dry manure is 0.8% total N, 1% total phosphate (as $P_2O_5$), and 1% potash as $K_2O_5$). Most of these nutrients are tied up as organic forms of the nutrients, and are released over time as plants grow. This slow-release nature of the nutrients is an important component of the present invention. Typical analysis of soluble forms of nitrogen is 5 ppm, of phosphate about 100 ppm, and for potash about 175 ppm. Ranges of nutrients are 0.5 to 1 for total N, 0.5 to 1% ppm for total phosphate or potassium. Ranges for soluble forms of the same nutrients are 2-20 for N, 50-100 ppm for P or K. The pH can also be adjusted by adding acid, which may be nitric, hydrochloric, or others to a solid carrier; for example montmorillonite clay. Almost any solid material with good water holding capacity can be substituted, including other clays, vermiculite, and saw dust.

Acidification with nitric acid readily forms media with total nitrogen of 0.6% and soluble nitrogen of 20 to 200 ppm, while phosphate and K are unaffected.

This basic ingredient can be blended with any standard horticultural medium to prepare mixes with different properties for various purposes, including peat moss, vermiculite, perlite, various tree barks with or without composting, mushroom composts and composts made of almost any organic material. An almost infinite variety of mixtures can be prepared, with different nutrient characteristics, porosity, pH levels or other characteristics. A special case is growing media for plants that require low pH and iron. In this case, the medium can be further acidified and iron can be added. A useful source of both is spent media from hydrogen sulfide removal as described in WO 2010/045562, which is hereby incorporated by reference in its entirety.

Example 5

Further Advances in Planting Media Construction

This method uses tomato as an indicator for plant and soil tests, as described are as before. However, there are opportunities to improve the media in two different ways: (1) increase the use of organic materials and (2) include beneficial microbes that can dramatically increase the performance of plants grown in the mixes. Suitable organisms have been described in WO 2010/091337, which is hereby incorporated by reference in its entirety, and a mixture of the strains described there were used in these studies.

The components described above can be used to prepare novel planting media with many useful properties. Typically, these include bovine manure at 40-50% of the total mix, a peat moss or other relatively inert ingredient (various composts can be substituted, such as leaf compost), a source of immediately available nitrogen such as Chilean nitrate, a source of nitrogen fertilizer that is available in the medium term, such as composted chicken manure, and an ingredient to improve drainage and air porosity.

It is possible to substitute organic materials for vermiculite or perlite. Rice hulls are frequently sold for this purpose, and it was found that coffee chaff or buckwheat hulls are excellent for increasing porosity and aeration of potting media.

The sources of nitrogen, phosphorous, and potassium in potting media require special attention. Sources of nitrogen for organic use have been described (Lipsom and Näsholm, "The Unexpected Versatility of Plants: Organic Nitrogen Use and Availability in Terrestrial Ecosystems," *Oecologia* 128 (3):305-316 (2001); Bollard, "A Comparative Study of the Ability of Organic Nitrogenous Compounds to Serve as Sole Sources of Nitrogen for the Growth of Plants," *Plant and Soil* 25(2):153-166 (1966); Peoples et al, "Biological Nitrogen Fixation: An Efficient Source of Nitrogen for Sustainable Agricultural Production?," *Plant and Soil* 174:3-28 (1995), which are hereby incorporated by reference in their entireties).

The dairy manure described in Example 1 contains adequate nitrogen, phosphorous, and potassium for plant growth if used at high concentrations. However, the nitrogen is not immediately available, and so plants grow extremely poorly in a media composed only of this material or if used in other media at high concentrations in the absence of other nitrogen sources. Moreover, it has a high pH of about 8, and this is too high for growth of most plants.

Other sources of nitrogen provide rapid and medium release of this nutrient. Chilean nitrate provides an immediate source of nitrate, and chicken manure compost provides some immediate release nitrogen and some over a longer period of time. Moreover, the nitrogen is mostly in the form of ammonium (i.e. typically a 90:10 ratio of ammonia to nitrate in the source used in the present invention). Thus, a mixture that contains a high proportion of dairy manure, and smaller amounts of Chilean nitrate and chicken manure compost, for example, provides a rapid, a medium and a slow release but large amount of nitrogen that is ideal for plant growth. Other sources of rapid release nitrogen include fish meal, and medium release materials include a number of plant-based materials including soybean meal and alfalfa meal. The preferred embodiment of the present invention includes chicken manure and Chilean nitrate since these two ingredients provide a blend of nitrate and ammonia nitrogen that is important for maximum plant growth. The plant propagation medium may also contain clay, biochar, or other material that is added to minimize excess phosphorus release from manure and to release it over time to growing plants.

These sources of nitrogen can be augmented by the addition of *Trichoderma* strains mentioned earlier. They can increase NUE by 50% or more and so increase the time that fertilizer is available, and thereby increase plant growth. Only a small amount is required—i.e. about $10^4$ to $10^5$ colony forming units per cc of growing media.

One drawback of essentially all currently available potting or plant propagation media is that they must receive frequent additions of fertilizer, especially nitrogen, for good plant growth. Such additions are laborious and time consuming, and are expensive. Moreover, since much of the fertilizer applied may not be taken up by plants, the excess may contribute to water and air pollution. The improvements in plant NUE by use of *Trichoderma* strains overcomes this objection.

After extensive testing, an example of the present invention is a mix that contained 45% peat moss (Fafard organic grade, no added lime or surfactants), 45% dairy manure, and 10% vermiculite by volume. To this mix was added 220 g of chicken manure compost (containing chicken manure and oak sawdust) and 58 g of Chilean nitrate per cubic foot (28.3 L) of mix. The utility of beneficial microbes mentioned earlier (i.e. strains of *Trichoderma* spp) was also demonstrated. *Trichoderma* strains at $10^5$ colony forming units per cc of mix were added to half of the mix. The *Trichoderma* strain mix was composed of equal parts of the three strains in WO 2010/045562, which is hereby incorporated by reference in its entirety, and a strain of *T. vixens* in U.S. Pat. No. 4,966,157, which is hereby incorporated by reference in its entirety. This was compared with the Cornell mix, which is a standard peat, and vermiculite potting mix to which fertilizer is added. These three media were planted with 'Sweet 100' tomato plants, and no fertilizer was added for more than 100 days. Results are set forth in FIG. 1. Plants grown in the Cornell mix (left plants) were yellow and would soon die from lack of nitrogen fertilizer, the plants in the center were in the potting soil described above without *Trichoderma* strains, and the plants on the right were grown in potting soil plus *Trichoderma*. The plants in the center were much healthier than the plants in the Cornell mix, but were substantially smaller than the plants with *Trichoderma*. The potting soil, with its mix of nitrogen fertilizers provided continuous feeding throughout the long period of growth. This feeding is enhanced by the ability of the *Trichoderma* strains to increase NUE.

Thus, the present invention creates a potting soil that is biologically active and that does not have to be fertilized for the life of most greenhouse plantings.

Figure 2:
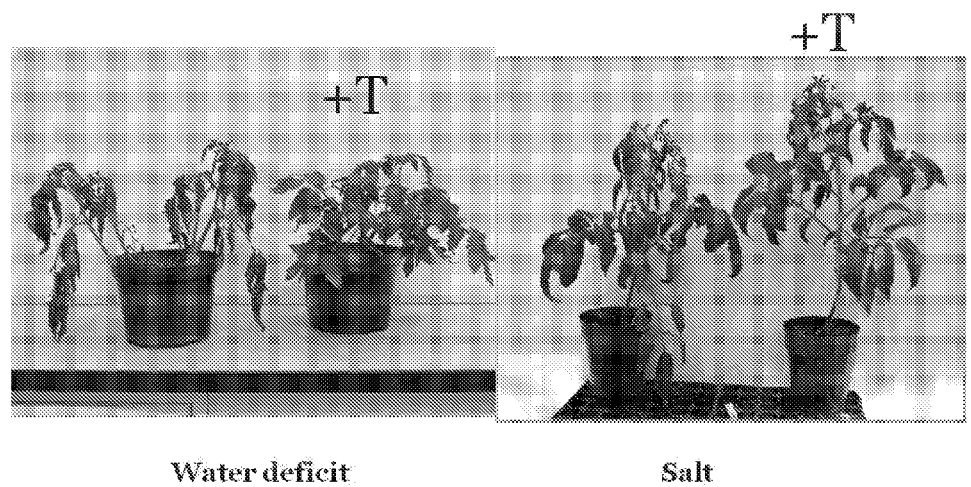
FIG. 2 illustrates the effect of the media of the present invention on plants regarding resistance to water deficit and salt stress. The *Trichoderma* strains provided dramatic resistance to salt and drought stress.

There are many other advantages to the media as described above. One of them is that it produces value-added plants that are resistant to drought and salt stress, as shown in FIG. 2. As can be seen in FIG. 2, the *Trichoderma* strains provide dramatic resistance to salt and drought stress.

There are a variety of advantages of the media itself, including: (1) very long feeding of plants through immediate use of the rapidly available sources of N, and long term feeding through breakdown of complex nitrogen sources such as manures; (2) very good pH for growth of plants (the mixture of peat and manure has a pH of between 6 and 6.5); (3) adequate levels of P and K that are provided throughout the life of the plant; and (4) good soil aeration and water percolation through the use of vermiculite. In the preferred embodiment of the present invention, seed or chaffs from organic sources are substituted for vermiculite.

Other added advantages of the *Trichoderma*-amended media include: (1) resistance to disease (biotic stresses); (2) resistance to abiotic stresses; and (3) even greater life of plant nutrient levels and reduced pollution of the environment.

The mechanism of increased abiotic stress reduction is through more rapid cycling of plant antioxidants. Consequently, food crops produced in the media are likely to contain higher levels of antioxidants and thereby be more nutritious.

These are great improvements in the culture of plants that are not available otherwise. The elimination, or great reduction, in the need for plant fertilizer additions, improves profitability of growers and convenience of use of backyard gardeners. The increase in biotic stress resistance reduces the need for pesticides. The increase in abiotic stresses is a strong value-added aspect, as is the fact that these factors make it relatively easy for growers to produce organic plants, which provides an increase in customer appeal. Finally, the probable increase in nutritional content of produce is another benefit.

Example 6

Buffering of Nutrient Levels

Manures have an additional disadvantage of being likely, when present at high percentages of compositions, to release excessive amounts of soluble phosphates when they first are wetted for planting. These levels may reach 450 ppm in fields with banded fertilizers, which could be toxic to seedlings (Pan et al., "Phosphorous Fertilizer. Phosphorous Banding and Starter," *Washington State University Extension Publication* EB 1637, which is hereby incorporated by reference in its entirety), although a slightly higher toxic level probably occurs in potting soils where the nutrient is unlikely to be concentrated in bands. In addition, as watering occurs, this phosphate is flushed out of the growing medium, and media then are likely to have too little phosphate to support good plant growth (1-5 ppm or less).

This difficulty may be overcome by adding components to the medium that will absorb excess phosphate and release it over time. This provides a much more even level of this essential plant nutrient, with concomitant improvements in product performance.

In previous Example 3, it was reported the unusual events that occurred with that planting medium, which included an initial very high level of nitrate N, P, and K and that these decreased shortly after media were irrigated. This was puzzling, but understanding of the factors permits development of highly buffered, more reliable media. Producing potting media using manure that was not fully dried was attempted, but plant growth was poor and seedlings developed red coloration, which usually is an indication of P nutrient imbalance. In addition, nitrate levels dropped more rapidly than in other experiments including the ones in Examples 3-5.

A major requirement for potting media where there is a potential for variable results in release and retention of soluble phosphorus is to add a material that will absorb high levels of the material and then to release back into the mix when ambient levels drop to low levels. There will be an equilibrium between bound and released materials. Fortunately, P levels in soil need to be maintained at a low, but stable level.

Various substances can absorb excess nitrate or phosphate and release it slowly. Among these materials are various clays. They contain positive charges on their surfaces. Effective materials include chlorite, illite, kaolinite, and monmorillonite, arranged in descending order of efficiency; in experiments in the literature, the efficacy of removal of phosphate from solution ranged from 90 (chlorite) to 50% (montmorillonite) efficiency (Lake and MacIntyre, "Phosphate and Tripolyphosphate Adsorption by Clay Minerals and Estuarine Sediments," Project A-072-VA, VPI-VWRRC-BULL 109 Virginia Water Resources (1977), which is hereby incorporated by reference in its entirety). Further, the dynamics of absorption of phosphorus from clay-water systems (which occurs in moist planting media) have been described (Dean et al., "Absorption by Plants of Phosphorus from a Clay Water System. Methods and Ensuing Observations," *Soil Sci* 59:437-448 (1945), which is hereby incorporated by reference in its entirety). Another useful material is biochar, which is essentially a form of wood charcoal prepared under conditions of destructive removal of volatile compounds, to provide a highly absorptive black material. This substance is reported to store mineral nutrients for plants and to provide them over extended periods of time (Mann, "The Good Earth," *Nat. Geo.* 214:80-104 (2008), which is hereby incorporated by reference in its entirety).

Exactly this type of reaction appears to have occurred with some of the media described earlier. For example, with the medium in Example 3, which contained montmorillionite clay, reference already has been made to the fact that, when the medium initially was mixed, the nitrate N, soluble P and soluble K levels were high (1200, 1900 and 2200 ppm).

However after watering, which would permit absorption of the ions to the clays, the levels immediately dropped to 75 ppm available N, 250 ppm available P, and 300 ppm available K.

To further elucidate the absorption phenomenon, solutions of $Na_2HPO_4/NaH_2PO_4$ at pH 6.5 were prepared to give solutions containing approximately 300 ppm of phosphate. These were mixed with Fuller's earth clay at the level of 5% wt/vol and allowed to incubate with shaking for 30 minutes. As expected, the control contained 300 ppm of P, while the treated sample contained only 180 ppm, for a 40% reduction, thus providing experimental validation of the concept.

Example 7

Pads Containing Manures or Composts

There is great interest in nonwoven fabrics for various purposes including: living walls and living roofs; instant turf; erosion control mats; and use in greenhouse vegetable production. The actual and specific composition of pads for these purposes differ somewhat, but for the purposes of the present invention, the following are general characteristics required.

There is an upper absorptive layer onto which seeds are sown. This layer may or may not include manure or other slow-release organic materials. In the preferred embodiment, this layer is simply a layer that has a fluffy texture so seeds do not move after application and that is water absorptive. It needs to be of a texture so that roots, but not shoots, readily penetrate the layer. Useful materials for production of this upper layer have been described in U.S. Pat. No. 7,883,625, which is hereby incorporated by reference in its entirety. They include synthetic fibers including polypropylene, PET, polyester, acrylic, rayon, acetate, liquid crystal polymers, aramids, polyphenylene sulfide, fiberglass, polybenzimidazole, melamine, polyvinyl chloride, ceramics, polyethylene, polyvinyl alcohol, and combinations thereof, and natural fibers including of kenaf, wood pulp, hemp, cotton, cellulose, jute, abaca, kapok, canton, pacol, ramie, maguey, sisal, pina, buntal, cabo negro, coir, and combinations thereof. Rayon or some other cellulose derivate is a preferred material since it is biodegradable and can be obtained in forms that enhance manufacturing.

The upper layer may be further enhanced by seeding into or with sticker substance that may include butyl adhesives; various organic gums, such as gum arabic, carheegan or similar material; dextran or cellulose derivatives and the like. It may be further enhanced by providing a plant seed germination enhancing mulch composed of particulate cellulose, straw or similar matrix.

In a preferred embodiment, this overlays a layer or admixture that contains manure, or nitrogen amended manure, mushroom compost or other organic nutrient providing substance.

Typically, there also is a bottom layer that is root, but not shoot, permeable and that can be composed of materials similar to the upper layer just described. However, for optimal use, this layer also contains a super-absorbing ingredient such as treated cellulose fibers, acrylamide powders or starch derivates; such components typically absorb 50 to 100 times their weight in water, and swell, this providing a moisture reserve for the growing plants. The bottom layer itself will absorb 20 to 100 times its weight in water.

The middle layer, composed of the organic nutrient providing substance is generally a loose material that is held together with the upper and bottom fabrics. The layers are typically held together by processing through a needle punch or other fabric-forming system.

Methods of manufacture can consist of any of a number of nonwoven fiber systems. One of these is a wet laid process that provides a material that, unlike the layered system above, is a single monolithic mixture of the organic nutritive substance such as manure and any of the fibers described above.

Figure 3:
FIG. 3 shows the preferred embodiment of grass in the present invention, consisting of a layered system formed by several different dry nonwoven processes including needle punch and air laid systems. The gray layer immediately beneath the grass is a pad, showing ready root penetration. The white layer at the bottom is a mass of roots produced by the plants.

A preferred embodiment consists of the layered system described above and can be formed by several different dry nonwoven processes including needle punch and air laid systems, as illustrated in FIG. 3. The gray layer just below the grass is the pad as described, showing ready root penetration. The white layer at the bottom is a mass of roots produced by the plants.

After growth of plants as shown, the plant-pad mixture can be hung vertically to provide a wall of living plants, used on roofs for living roofs, or rolled and taken to a site for instant lawns. In addition, before plant growth, the pads can also be used directly. Since the pads do not permit plant shoot penetration, they can be placed over living plants, such as growing lawns, so long as soil contact is made, and seeded with an alternative plant. A pre-seeded pad also can be used. In this way, for example, an instant flower bed can be established in a lawn.

Similar pads, with or without pre-seeding, can also be used for erosion control and for plant establishment on, for example, road cuts or stream banks.

Finally, if pads are made thicker, which can be easily done, they can be used as a replacement for rock wool pads for greenhouse vegetable production. The current system is to grow, for example, tomatoes or cucumbers, by placing them in a rock wool pad where irrigation and nutrition is provided by an ebb and flow irrigation system with nutrients. Such systems provide environmental problems; the rock wool pads themselves are not biodegradable and so accumulate and pesticides and fertilizers accumulate in the ebb and flow solutions and are difficult to dispose of Thicker pads with slow release fertilizers would provide an almost total replacement system for these applications.

Example 8

Addition of Organic, Natural Nutrient Source

Manure or mushroom compost can provide some of the plant nutrients required for plant growth, but higher levels are needed. One source of plant nutrients that would be extremely advantageous for the present invention are natural plant-based nutrients. Examples include the meals left over from soybean or other seed crushing operations to prepare oils for consumption or bioenergy (e.g, biodiesel). Seeds used for these purposes include grape, canola, crambe, safflower, squash, pumpkin, or the like. These sources can be added to any of the materials described in the remainder of this application. Other sources may include high nitrogen animal wastes, such as chicken manure or composted chicken manure.

Example 9

Addition of Beneficial Microbes

Any of the media described in the examples above can be amended or made to include formulations of beneficial microbes. Typical rates for such amendments are $10^5$ to $10^6$ colony forming units of the beneficial organisms per gram of medium.

The advantages of such systems are numerous. For example, the system suppresses disease. *Trichoderma* spp. have long been used as biocontrol agents, especially for disease control. Strain T22 has long been used for this purpose. *Trichoderma* spp. provides an advantage to greenhouse growers. Even better results are likely if the *Trichoderma* strains used include one or more of the strains described WO 2010/091337 to Harman, which is hereby incorporated by reference in its entirety. One application of *T. harzianum* provides better root growth than multiple applications of chemical fungicide. *T. harzianum* colonizes and grows with the root, thereby providing season-long protection. *Trichoderma* strains also provide systemic disease protection to plants, so even though they are present only on roots, the above ground parts of the plants have a measure of protection.

In addition, this system allows for increased nitrogen use efficiency. *Trichoderma* strains have recently been shown to increase nitrogen use efficiency. Newer strains recently discovered seem highly efficient in this regard, with first reports just now becoming available (Harman and Mastouri, "Enhancing Nitrogen Use Efficiency in Wheat Using *Trichoderma* Seed Inoculants," *Proc International Cong. of Plant Microbe Interactions* CD (2009), which is hereby incorporated by reference in its entirety). This has very practical value for greenhouse growers. Fertilizer is expensive, and becoming more so. If, as believed for field crops, nitrogen fertilizer can be reduced by 30%, this will cost less in production.

The system of the present invention also improves resistance to abiotic stress. *Trichoderma* strains have abilities to overcome a wide variety of plant stresses, including drought, salt or osmotic stress, and temperature stress. This appears to be via a common mechanism of ameliorating high levels of plant damaging oxidative stress compounds that accumulate when plants are under stress (Shoresh et al., "Induced Systemic Resistance and Plant Responses to Fungal Biocontrol Agents," *Annu. Rev. Phytopathol.* 48:21-43 (2010), which is hereby incorporated by reference in its entirety) is not very important to greenhouse operations per se, since plant stressful conditions are not likely to be permitted in the greenhouse. However, abiotic stress resistance can be a very powerful advertising and marketing tool.

Further, the present invention allows for increased convenience and simplicity. Greenhouse growers wish to minimize their labor and other inputs. By providing a convenient and easy to use, pre-inoculated mixture containing *Trichoderma*, they can avoid unnecessary steps and handling. This will also save them money.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A plant propagation medium, the improvement comprising a non-composted manure, the non-composted manure having a moisture content of 10 to 35 wt % with a salt level sufficient to achieve a conductivity of less than 0.35 dS/m.

2. The plant propagation medium of claim 1, wherein the non-composted manure contains a nutrient content wt % of 0.3 to 0.8, 0.4 to 1.2, and 0.4 to 1.2 of N, $P_2O_5$, and $K_2O$, respectively, and soluble nitrogen levels of less than 15 ppm.

3. The plant propagation medium of claim 1, wherein the plant propagation medium is non-dusting, pathogen and odor free.

4. The plant propagation medium of claim 1, wherein the non-composted manure comprises at least 30 wt % of the plant propagation medium.

5. The plant propagation medium of claim 1, wherein the plant propagation medium has a pH of between 6.0 and 7.5.

6. The plant propagation medium of claim 1, wherein the plant propagation medium has a pH of between 4.0 and 6.0.

7. The plant propagation medium of claim 1, wherein the plant propagation medium further comprises:
a slow release fertilizer or soil conditioner, a mixture of rapid-, medium-, and slow-release nitrogen sources, plant-based natural nutrient substances or high nitrogen wastes, a plant-based natural nutrient substance in the form of cakes or residues from oil seed recovery operations, peat moss, leaf compost, vermiculite, perlite, Chilean nitrate, rice hull, coffee chaff, buckwheat hull, chicken manure, various tree barks with or without composting, mushroom composts, or a compost of other organic material.

8. The plant propagation medium of claim 1, wherein the plant propagation medium further comprises:
a microbe beneficial to plant growth.

9. The plant propagation medium of claim 8, wherein the microbe is a *Trichoderma* strain.

10. A pad comprising:
the plant propagation medium of claim 1 and
natural or synthetic fibers.

11. The pad of claim 10, wherein the plant propagation medium and the fibers are integrated into a single mass.

12. The pad of claim 10, wherein the plant propagation medium is present in the pad as a layer between layers of the fibers.

13. The pad of claim 10 further comprising:
a super-absorbing polymer capable of holding 20 or more times its weight in water.

14. The pad of claim 10 further comprising:
plant seeds and
a germination enhancing medium.

15. The pad of claim 10 further comprising:
dried concentrated mushroom compost.

16. A method of growing plants comprising:
providing the plant propagation medium of claim 1;
planting plants or plant seeds in the plant propagation medium; and
growing the planted plants or plants from the planted plant seeds in the plant propagation medium.

17. The plant propagation medium of claim 1, wherein the non-composted manure is separated from liquid manure and dried.

* * * * *